US006942041B1

(12) United States Patent
Kraus et al.

(10) Patent No.: US 6,942,041 B1
(45) Date of Patent: Sep. 13, 2005

(54) SELF-PROPELLED AGRICULTURAL VEHICLE CONSTRUCTED USING A STANDARD ROW-CROP TRACTOR AS A BASE

(75) Inventors: Timothy James Kraus, Hedrick, IA (US); Walter Mark Schlesser, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/865,460

(22) Filed: Jun. 10, 2004

(51) Int. Cl.[7] .............................................. A01B 69/00
(52) U.S. Cl. ......................... 172/431; 172/439; 37/466
(58) Field of Search ............................... 172/431–436, 172/439; 37/466

(56) References Cited

U.S. PATENT DOCUMENTS 3,568,778 A * 3/1971 Swisher et al. ............. 172/785
4,186,811 A * 2/1980 Bidon ....................... 180/6.48
4,340,127 A * 7/1982 Broberg ...................... 180/327
4,364,438 A * 12/1982 Pyle ........................... 172/789
4,630,700 A * 12/1986 Larsson .................. 180/89.13
5,265,995 A * 11/1993 Beck .......................... 414/694

FOREIGN PATENT DOCUMENTS

DE 3346309 A1 * 7/1984 .......... B62D 33/06
FR 2530605 A * 1/1984 .......... B60K 23/00

* cited by examiner

*Primary Examiner*—Robert E. Pezzuto
*Assistant Examiner*—Alexandra K. Pechhold

(57) ABSTRACT

A self-propelled agricultural vehicle is constructed by assembling the parts of a standard row-crop tractor to the point where the next step is that of mounting the cab to the chassis. At this point, a cab adapter module is mounted to the chassis using the mounting points normally used for mounting the cab to the chassis. The cab, provided in a form without the usual access ladder and fenders, is mounted to the cab adapter module so as to face in a direction opposite to that which it would face if mounted to the chassis. The seat and all controls for operating the tractor remain in the same locations in the cab regardless which direction the cab faces. Minor reconfigurations of hydraulic circuitry and the differential are required for permitting the vehicle to be operated in a forward direction opposite to that for the operation of the standard tractor.

6 Claims, 9 Drawing Sheets

SELF-PROPELLED AGRICULTURAL VEHICLE CONSTRUCTED USING A STANDARD ROW-CROP TRACTOR AS A BASE

FIELD OF THE INVENTION

The present invention relates to agricultural tractors, and more specifically relates to a way of manufacturing a self-propelled implement using the components of a standard row-crop tractor equipped with a cab.

BACKGROUND OF THE INVENTION

Traditionally, manufacturers of agricultural tractors make one type of tractor for row-crop work and another for serving as the power unit for self-propelled implements, such as a windrowers or mower-conditioners, for example. Standard agricultural tractors are often equipped with an operator's station housed within a cab which is situated between a pair of rear drive wheels of the tractor and facing forward toward an engine of the tractor, while the power unit for a self-propelled implement, such as a windrower, is commonly equipped with a cab located between a pair of front drive wheels and faces in a forward direction away from the engine so that the operator has excellent visibility of front-mounted equipment. The physical appearance of the tractor and power unit are generally similar, with the primary difference being the direction the vehicle is driven in normal forward operation. The manufacture of two different tractors leads to increased costs, especially if one or the other enjoys an economy of scale due to the number of units sold.

Heretofore, it has been known to provide a tractor equipped with a cab in which the seat, steering wheel and control console are mounted for swiveling about a vertical axis between a first position wherein the operator faces the engine and operates the tractor for towing implements, and a second position, wherein the operator faces away from the engine and operates the tractor in good view of front-mounted equipment. However, this known tractor has a hydrostatic transmission which may be easily reversed in operation without a degradation of function, i.e., the operating characteristics of the transmission remain the same for propelling the tractor in opposite directions. This is in contrast to a tractor equipped with a gear transmission wherein mating gears often have their greatest load carrying capacity only when driven so as to propel the tractor in one direction. An example of a prior art tractor which may be operated in a bi-directional manner is disclosed in U.S. Pat. No. 4,059,171.

Therefore, the problem to be solved is that of being able to use substantially all of the components of a standard, row-crop tractor in the manufacture of a dedicated, self-propelled implement tractor which has a forward operation mode that is the reverse of that of a standard row-crop tractor.

SUMMARY OF THE INVENTION

According to the present invention there is provided a way of utilizing substantially all of the components of a standard row-crop tractor, equipped with a cab, in constructing a self-propelled agricultural vehicle which has a normal forward direction of operation opposite to that of the standard row-crop tractor.

An object of the invention is to provide structure for use in conjunction with a cab-equipped, standard row-crop tractor for constructing a self-propelled vehicle having a normal forward direction of operation, that is the reverse of that of the standard tractor, without requiring movement of any of the controls contained within the cab.

The foregoing object is accomplished in part by providing a cab adapter module which may be optionally mounted to a first set of cab attachment points normally used for attaching the cab to the chassis of the standard tractor, with the cab adapter module being provided with a second set of cab attachment points to which the cab may be coupled so as to face in a direction opposite to that in which it would face if coupled to the chassis at the first set of cab attachment points. In the case where the tractor is equipped with a gear transmission, the differential ring gear is changed to mesh at the opposite side of the drive shaft pinion so as to reverse the output to the drive wheels. If desired, axle extensions may be used to increase the distance between the drive wheels.

These and other objects will become apparent from a reading of the ensuing description together with the appended drawings.

DESCRIPTION OF THE PREFERRED EMBODIMENT

Figure 1:
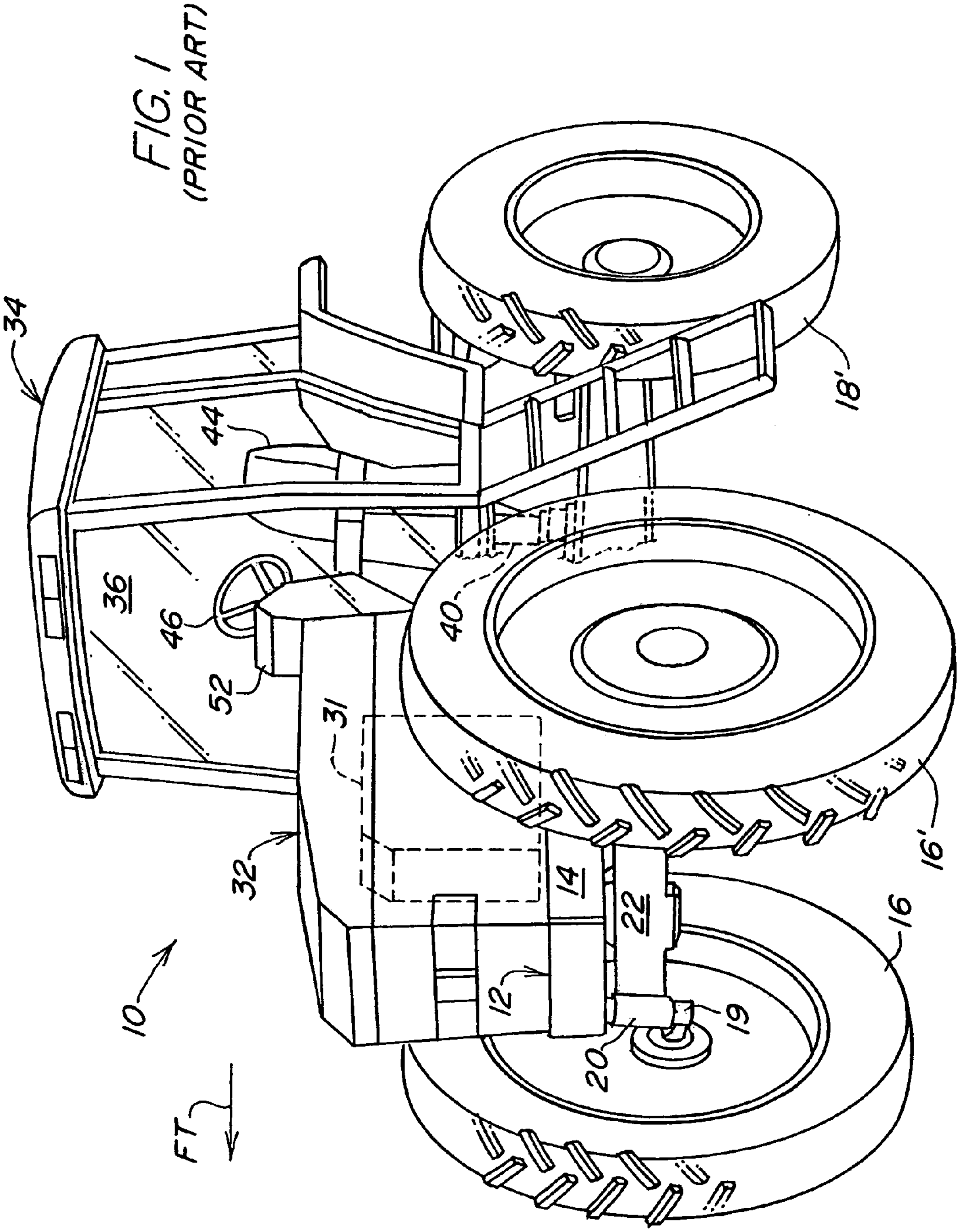
FIG. 1 is left front perspective view of a standard hi-crop tractor equipped with a cab.
Figure 2:
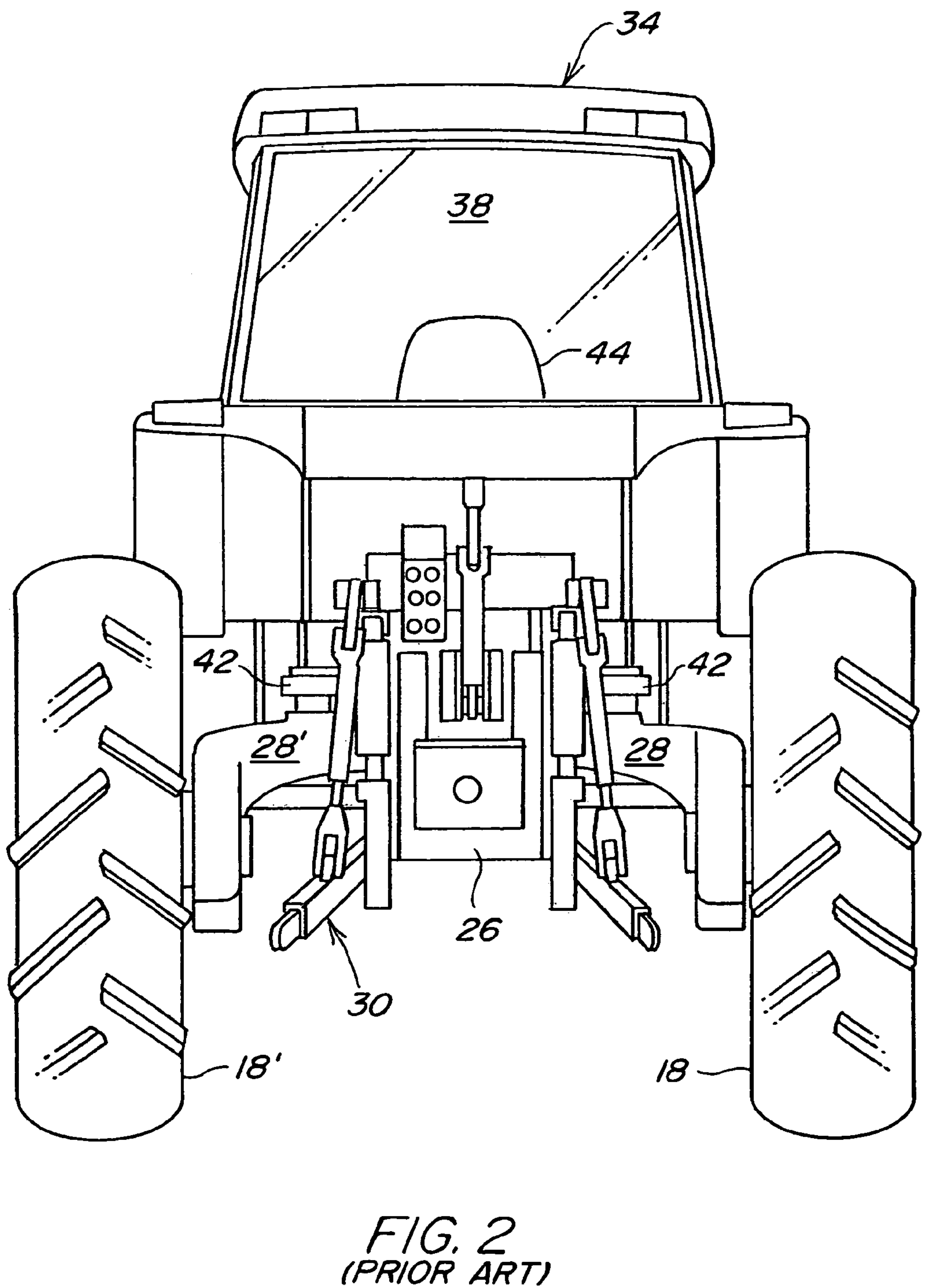
FIG. 2 is a rear view of the tractor shown in FIG. 1.

Referring now to FIGS. 1 and 2, there is shown a standard agricultural row-crop tractor here depicted as a hi-crop tractor 10 having additional clearance beneath it for permitting the tractor to pass over growing crops without causing crop damage. The tractor 10 has a normal forward direction of travel indicated by the arrow FT.

The tractor 10 includes a fore-and-aft extending main frame 12 including a pair of transversely spaced, parallel frame members 14. The frame 12 is supported for movement over the ground by a front pair of steerable ground wheels 16 and 16' and by a rear pair of drive wheels 18 and 18', with the wheels 16 and 18 being right-hand wheels, and with the wheels 16' and 18' being left-hand wheels as considered from the view point of a person standing behind the tractor 10 and facing in the direction of forward travel FT. The pair of front wheels 16 and 16' are respectively mounted to out-turned spindles forming parts of generally L-shaped knuckle and spindle units 19 and 19' having upright shaft sections respectively received within, and mounted for oscillating about respective upright axes defined by, tubular receptacles 20 forming opposite ends of a transverse front axle 22. The front axle 22 is mounted, at its midpoint, to a forward end location of the main frame 12 for pivoting about a horizontal, longitudinal axis defined by a pair of longitudinally spaced, fore-and-aft extending, axially aligned horizontal pivot pins (not shown). The axle 22 includes opposite end sections which are disposed in overlapping relationship to a middle section and are containing adjustment holes which may be selectively aligned with holes provided in the center section for achieving an adjustment of the distance between the wheels 16 and 16'.

Figure 3:
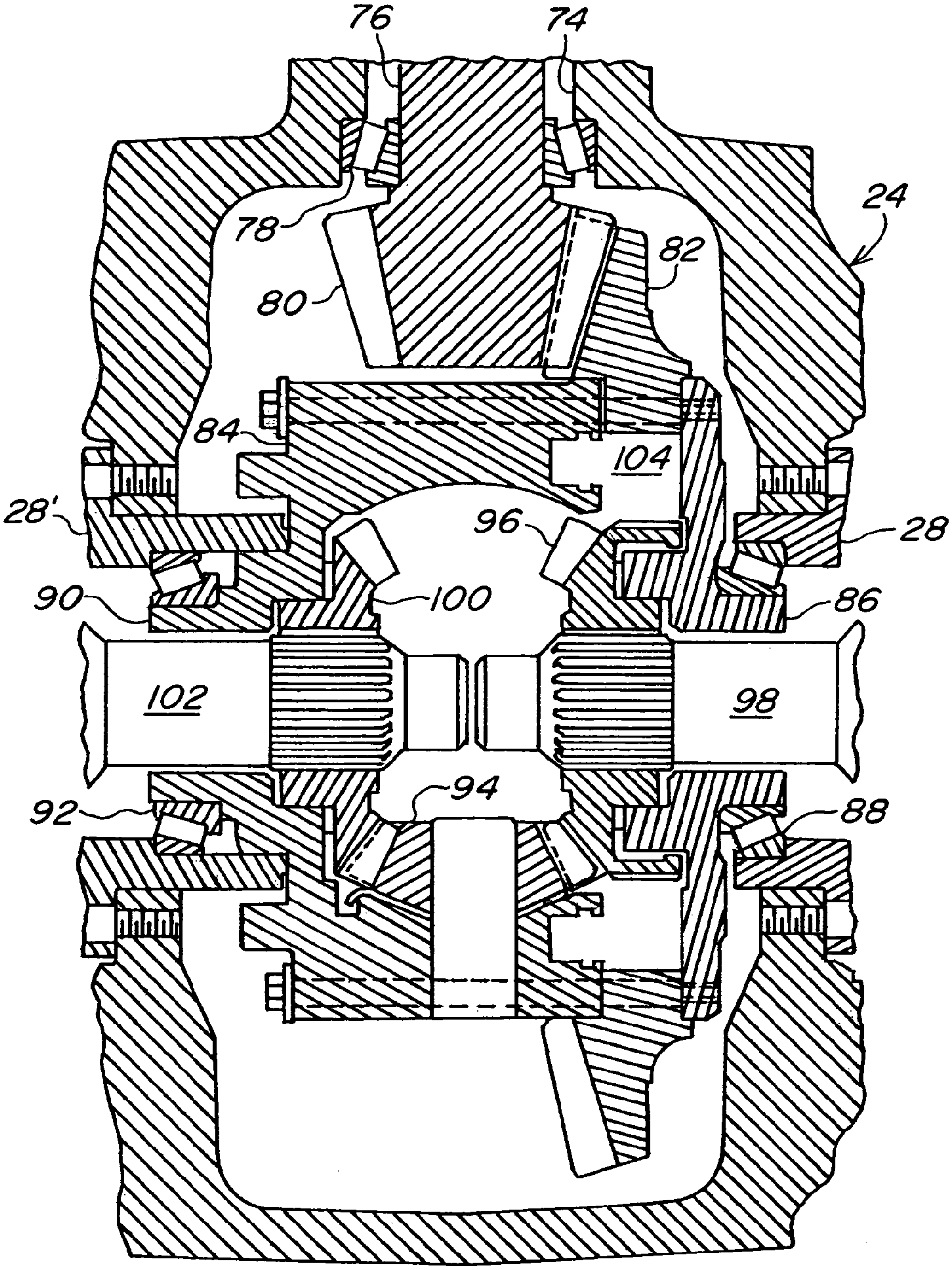
FIG. 3 is a horizontal sectional view taken through the rear differential housing of the tractor shown in FIGS. 1 and 2.

Bolted to the rear ends of the frame members 14, and, thus, forming a rearward extension of the main frame 12, is a rear differential gear housing 24 (FIG. 3). Bolted to the rear side of the housing 24 is a rear PTO housing 26. Respectively bolted to a right-hand surface of the housing 24 is a right-hand drop-axle or final drive housing 28, and bolted to a left-hand surface of the housing 24 is a drop axle or final drive housing 28'. Each of the housings 28 and 28' contains a shaft and gear arrangement (not shown) respectively coupled for driving the pair of rear drive wheels 18 and 18'. The rear differential gear housing 24 defines structure to which a three-point hitch 30 is mounted for carrying rear-mounted implements.

Power for driving the wheels 18 and 18' and for supplying the power for operating various hydraulic and electrical components of the tractor is derived from an internal combustion engine 31 coupled to the main frame and located within a compartment defined by a hood and side panel arrangement 32 disposed over approximately a forward half of the main frame 12. An operator's cab 34 includes a front window 36 positioned just behind the engine compartment 32 and a rear window 38 positioned approximately within a vertical transverse plane passing through the axis of rotation of the rear wheels 18 and 18'. The cab 34 is respectively mounted to the pair of frame members 14 by a pair of forward brackets 40 (only one shown), and to respective top locations of the pair of drop axle housings 28, as at connections 42. A main tractor transmission 43 extends between the engine 31 and the differential housing 24. Thus, the cab 34 is positioned over the main tractor transmission 43 and the differential housing 24, and is forward of the three-point hitch 30 so as to not interfere with its operation.

Located within, and mounted to the floor of, the cab 34 is a seat 44, which places an operator within reach of a steering wheel 46 connected to a steering shaft 48 (FIGS. 4 and 9) having a lower end received within a steering control valve 50 forming part of a steering control and mounted to a support panel (not shown) forming part of a control console 52. In a manner discussed in more detail below, the steering control valve 54 is hydraulically coupled to a pair of steering cylinders 56 and 56' (FIGS. 3 and 4) respectively coupled between the front axle 22 and a pair of steering arms 58 and 58', respectively coupled to the tops of the upright pins forming part of the L-shaped knuckle and spindle assemblies 19 and 19'. A tie-rod 60 is coupled between the steering arms 58 and 58'.

Mounted to a forward wall of the cab 34 at a location to the right of the steering shaft 48 is right- and left-hand brake pedals 62 and 64, respectively, associated with separate brake valve elements (not shown) contained within a housing of a brake valve 66 mounted to the forward wall of the cab and operable, as discussed in more detail below, for controlling brakes 68 and 68' (FIGS. 4 and 9) respectively associated with the rear drive wheels 18 and 18'.

Also located so as to be within reach of a seated operator are a set of manually-operable levers 70 (FIG. 2), which include at least one transmission shift control lever, although other control input devices such as knobs, etc. may be used. Although not an absolute necessity, the tractor transmission is preferably an electro-hydraulically controlled powershift transmission of a known design (for example, see U.S. Pat. No. 5,449,329, granted 12 Sep. 1995), which includes a plurality of fluid pressure operated clutches for controlling the flow of torque through the main transmission and a plurality of solenoid operated valves for selectively routing pressure fluid for effecting selected engagement of the clutches. In this patented transmission, the control system for actuating the solenoid valves and associated clutches includes micro-processor based electronic control units including a so-called chassis computer and a transmission control unit, the former receiving various pertinent input signals representing, for example, ground speed, engine speed, transmission oil temperature and the like, and sending these signals to the latter. Manual control is achieved by using a gear shift lever having switches associated therewith and an encoder that provides signals representing the position of the lever to the transmission control unit. Another manual control is similarly provided by operation of a clutch pedal. Thus, the only connection required between transmission control unit and the transmission is the wiring harness which couples the signal carrying lines to the transmission solenoid valves.

Referring now to FIG. 3, there is shown the housing 24 of the rear differential including a forward wall provided with a bore 74 in which a pinion shaft 76, which extends from the main transmission 43, is mounted for rotation through the agency of a bearing 78. The pinion shaft 76 is integral with a pinion gear 80 that is meshed with a ring gear 82 mounted to one end of a differential housing 84 located within the housing 24 and having a right-hand end defining a cylindrical, tubular hub 86 mounted for rotation within an inner end of the right-hand final drive housing 28 through the agency of a bearing 88, and having a left-hand end defining a cylindrical, tubular hub 90 mounted for rotation within an inner end of the left-hand final drive housing 28' through the agency of a bearing 92. Located within the differential housing 84 is a set of bevel pinions 94 (only one shown) which are meshed with a right-hand bevel gear 96 carried by a right-hand drive shaft 98 for driving the right-hand rear wheel 18, and meshed with a left-hand bevel gear 100 carried by a left-hand drive shaft 102 for transmitting torque for driving the left-hand rear wheel 18'. A cavity 104 for containing a differential brake assembly (not shown) is defined at the right-hand end of the differential housing 84.

Figure 4:
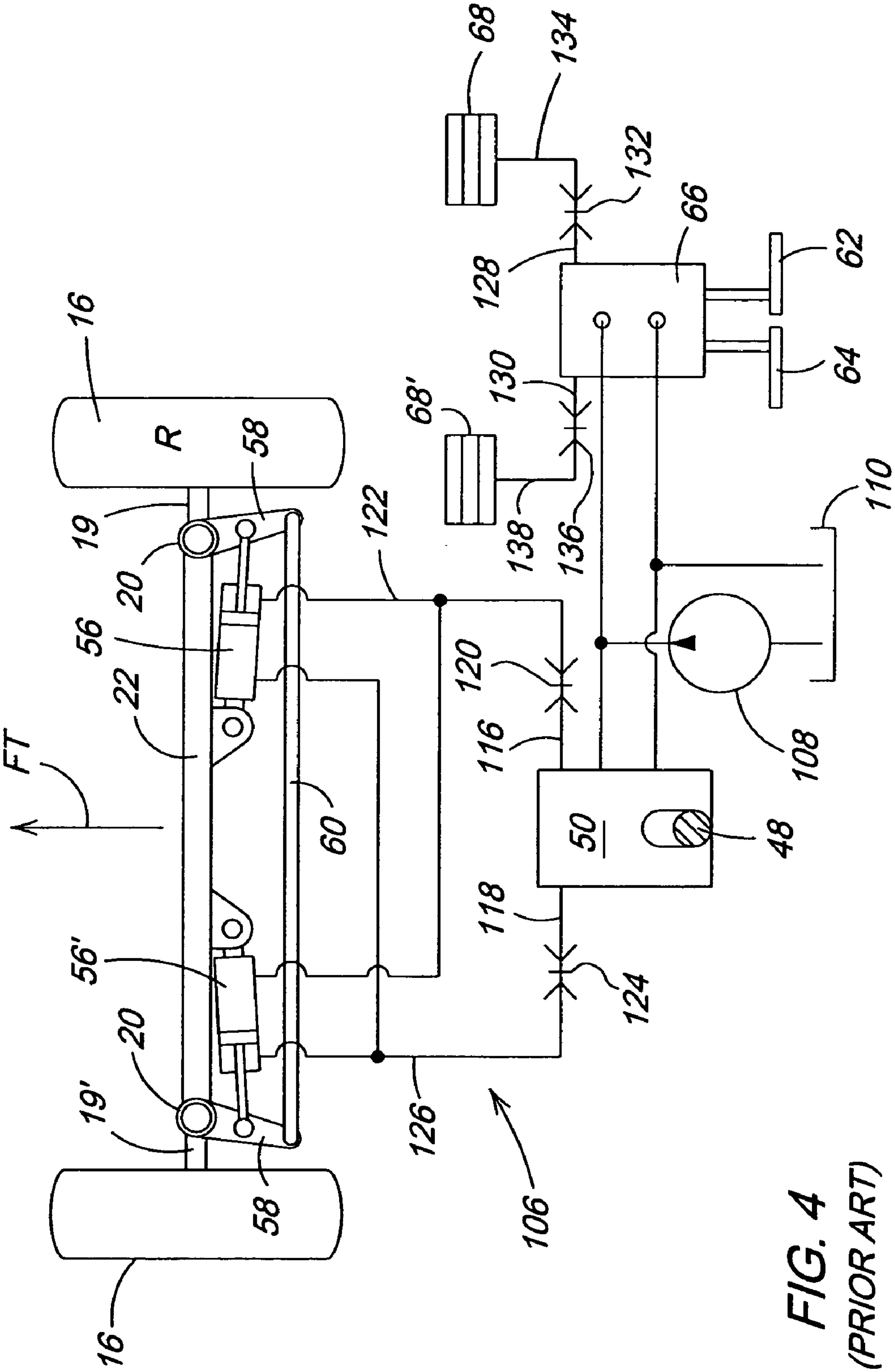
FIG. 4 is a schematic view showing the hydraulic fluid circuitry used for the conveyance of fluid for steering and brake control with the standard tractor shown in FIGS. 1 and 2.

Referring now to FIG. 4, there is shown a hydraulic control circuit 106 for controlling the steering and brake functions of the standard tractor 10. Specifically, each of the steering valve 50 and brake valve 66 are coupled to a source of hydraulic pressure, here indicated as being a pump 108, and a sump 110 by pressure and return lines 112 and 114, respectively. A pair of hydraulic fluid conduits 116 and 118 are respectively coupled to separate work ports of the steering valve 50. The conduit 116 is coupled, as by a quick coupler 120, to a branched fluid conduit 122 coupled to the rod end of the steering cylinder 56 and to the head end of the steering cylinder 56'. Similarly, the conduit 118 is coupled, as by a quick coupler 124, to a branched fluid conduit 126 coupled to the head end of the steering cylinder 56' and to the rod end of the steering cylinder 56. Thus, it will be appreciated that by turning the steering wheel 46 to the right (clockwise as viewed in FIG. 4) the steering valve 50 will be actuated to connect the pump 108 to the rod end of the cylinder 56 and the head end of the cylinder 56' so as to cause the knuckle and spindle units 19 and 19' to be swiveled clockwise so as to turn the wheels 16 and 16' to the right. Similarly, turning the steering wheel 46 counterclockwise will result in the cylinders 56 and 56' being respectively extended and retracted so as to turn the wheels 16 and 16' to the left.

The brake valve 66 includes a pair of work ports respectively to which are coupled fluid conduits 128 and 130. The conduit 128 is coupled, as by a quick coupler 132, to a conduit 134 coupled to the brake 68, and the conduit 130 is coupled, as by a quick coupler 136, to a conduit 138 coupled to the brake 68'. Thus, it will be appreciated that when the right-hand pedal 62 is depressed the brake valve 66 will be actuated to cause the brake 68 to be applied for braking the wheel 18. Similarly, depressing the left-hand pedal 64 will cause the brake valve 66 to be actuated to cause the brake 68' to be applied for braking the wheel 18'.

Figure 5:
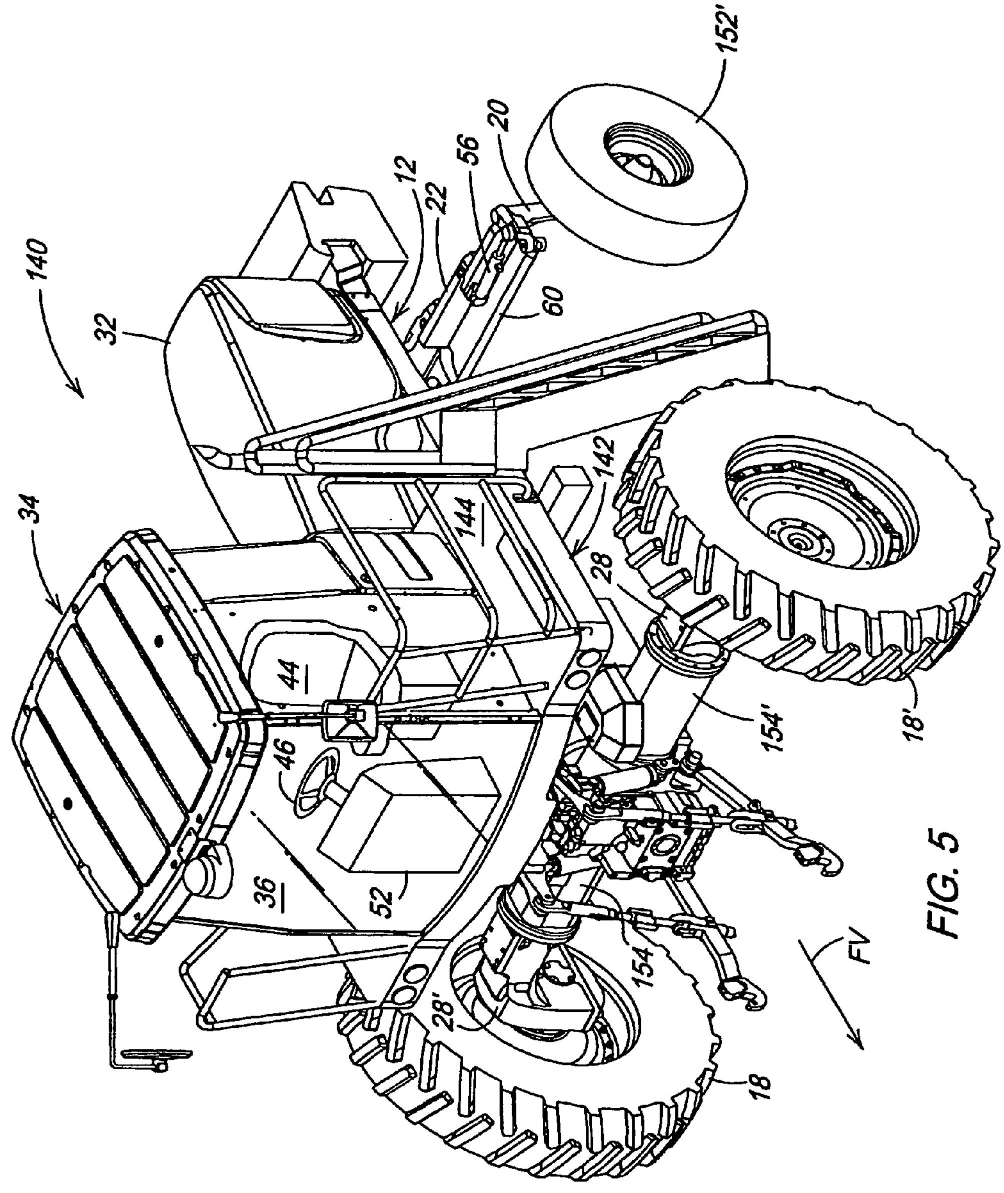
FIG. 5 is a left front perspective view of a self-propelled agricultural vehicle constructed utilizing most of the components of the standard tractor, illustrated in FIGS. 1 and 2, together with the cab adapter module of the present invention positioning the cab the and controls contained in the cab for a normal forward direction of operation opposite to that of the standard tractor.
Figure 6:
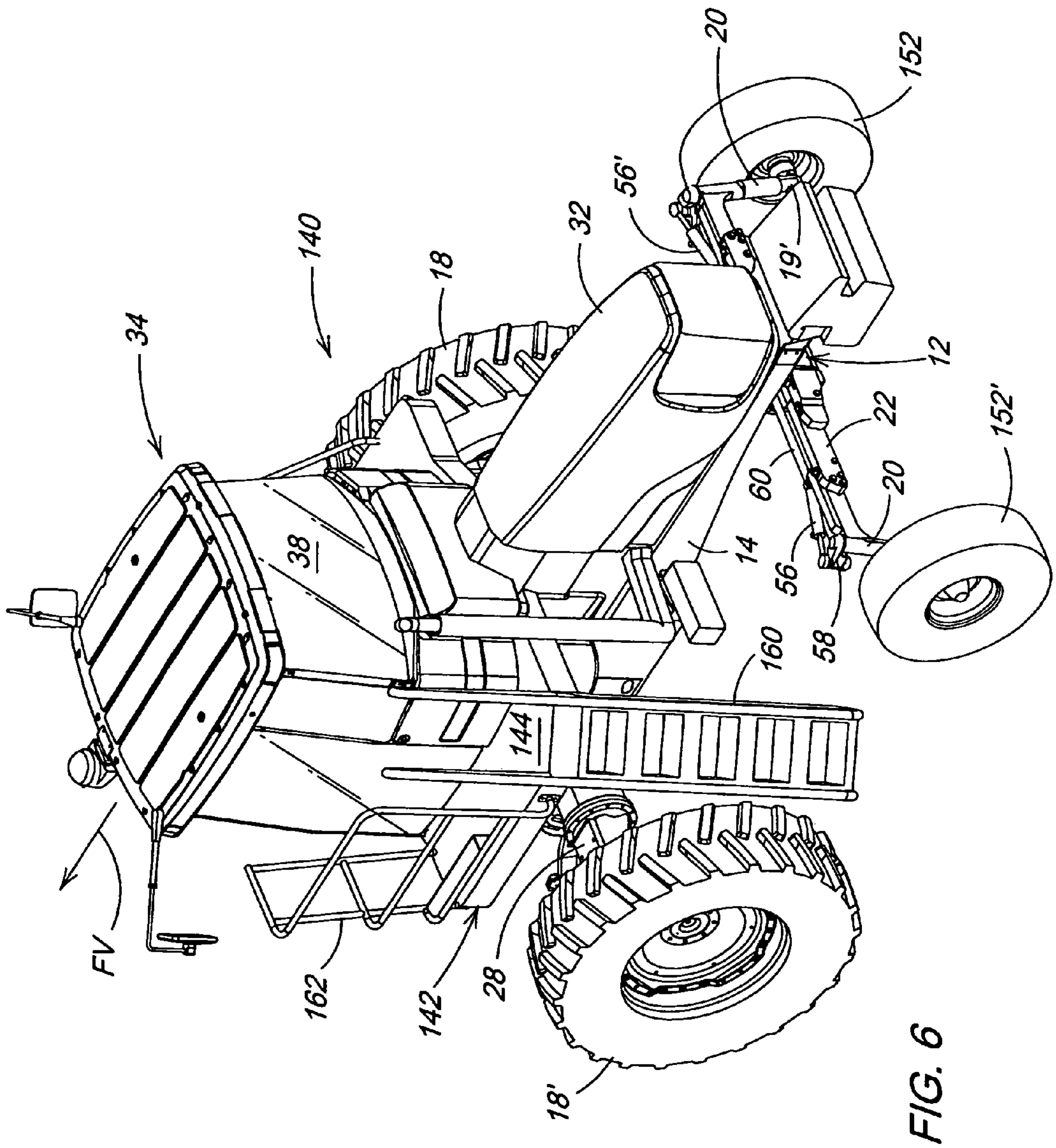
FIG. 6 is a left rear perspective view of the self-propelled agricultural vehicle shown in FIG. 5.
Figure 7:
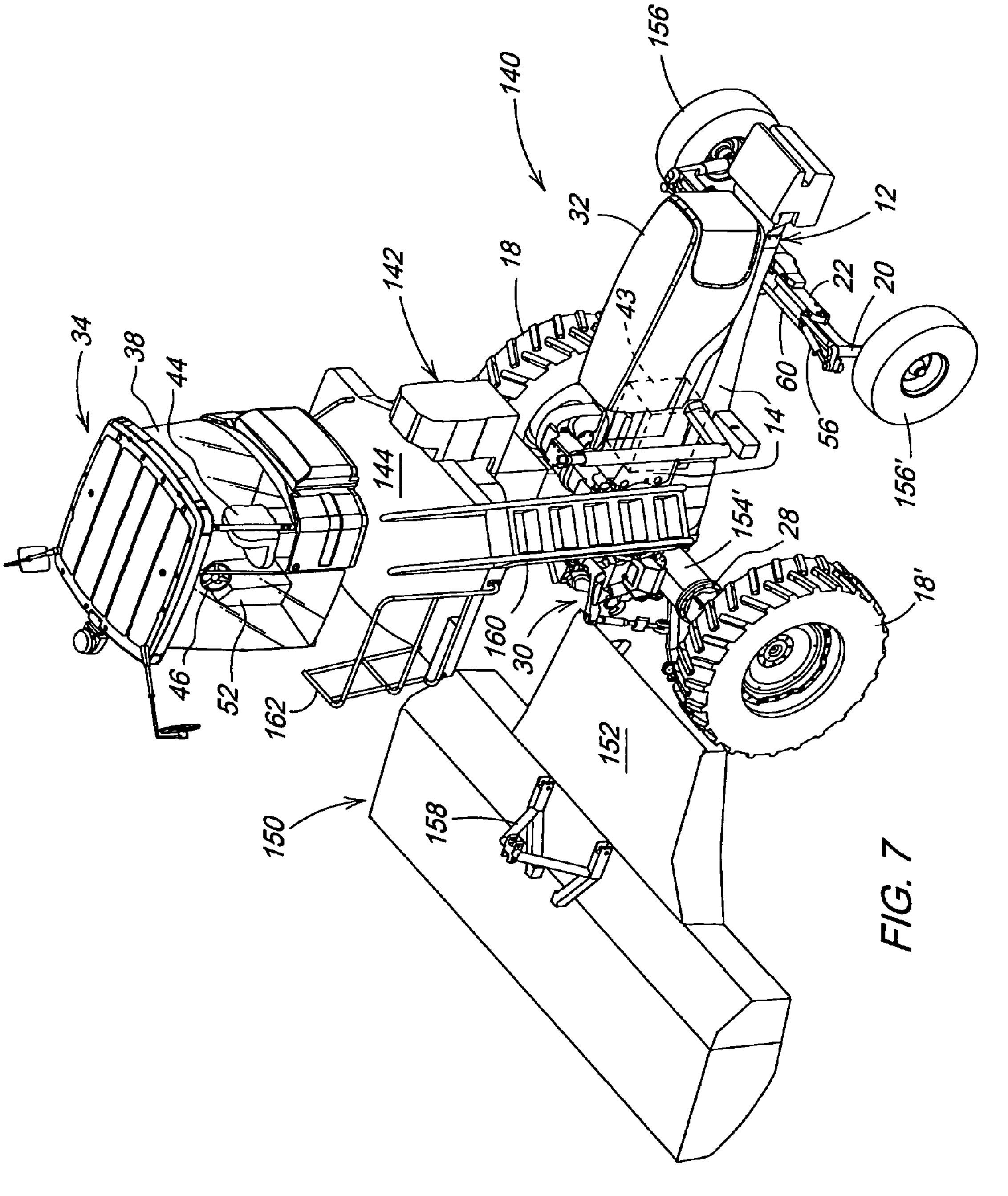
FIG. 7 is a schematic left rear exploded view of the self-propelled vehicle shown in FIGS. 5 and 6, but in addition showing a windrower platform for attachment to the front hitch of the vehicle.

Referring now to FIGS. 5–7, there is shown a self-propelled vehicle 140 constructed using a majority of the components of the standard tractor 10, with the common components being indicated by the same reference numeral call-outs as are used in describing the tractor 10. The vehicle 140 has a normal forward direction of operation indicated by the arrow FV which is opposite to the normal forward direction of operation FT of the tractor 10.

One major difference between the vehicle 140 and the tractor 10 is that the vehicle 140 includes a cab adapter module 142 which is mounted to the frame members 14 and axle housings 28 and 28' using the front and rear pairs of mounting brackets 40 and 42 used for mounting the cab 34 (absent fenders and ladder) to the frame 12 and axle housings 28 and 28'. The cab 34 is bolted (not shown) directly to the top of the adapter 142 so as to be reversed in direction from its position shown in FIGS. 1 and 2 and so as to be displaced rearward, as considered in FIGS. 1 and 2, of the location it occupies when mounted to the tractor 10. The adapter 142 has an upper surface 144 which is elevated above the area occupied by a floor of the cab 34, as mounted on the tractor 10, so that the cab will not interfere with the operation of the three-point hitch 30, which is here used to couple front mounted implements, such as a mower conditioner 150 (see FIG. 7) to the vehicle 140. In order to provide adequate clearance for a windrow forming structure 152 at the rear of the mower-conditioner 150 to fit between the wheels 18 and 18', tubular axle extensions 154 and 154' are respectively mounted between the housing 24 of the rear differential and the drop axle housings 28' and 28. The front axle 22 is in a lengthened condition relative to that shown in FIGS. 1 and 2 so that the distance between rear wheels 156 and 156' is commensurate with the spacing between the front wheels 18 and 18'. It is noted that the mower conditioner 150 includes a hitch attaching structure 158 located just forward of the windrow forming structure 152 and having respective connection points for the lower and upper draft links of the three-point hitch 30.

The cab adapter module 142 further includes a ladder 160 which affords access to the cab 34 by way of the top surface of the adapter 142. An appropriate guard rail 162 is also provided in the vicinity of an access door of the cab 34.

So as to have the tread on the wheels 18 and 18' properly oriented for the normal forward direction of travel FV of the vehicle 140, the wheels 18 and 18' are respectively mounted on the right- and left-hand sides of the vehicle 140. It is also noted that the rear wheels 156 and 156' are of a smaller diameter, this replacement is elective, not necessary.

Figure 8:
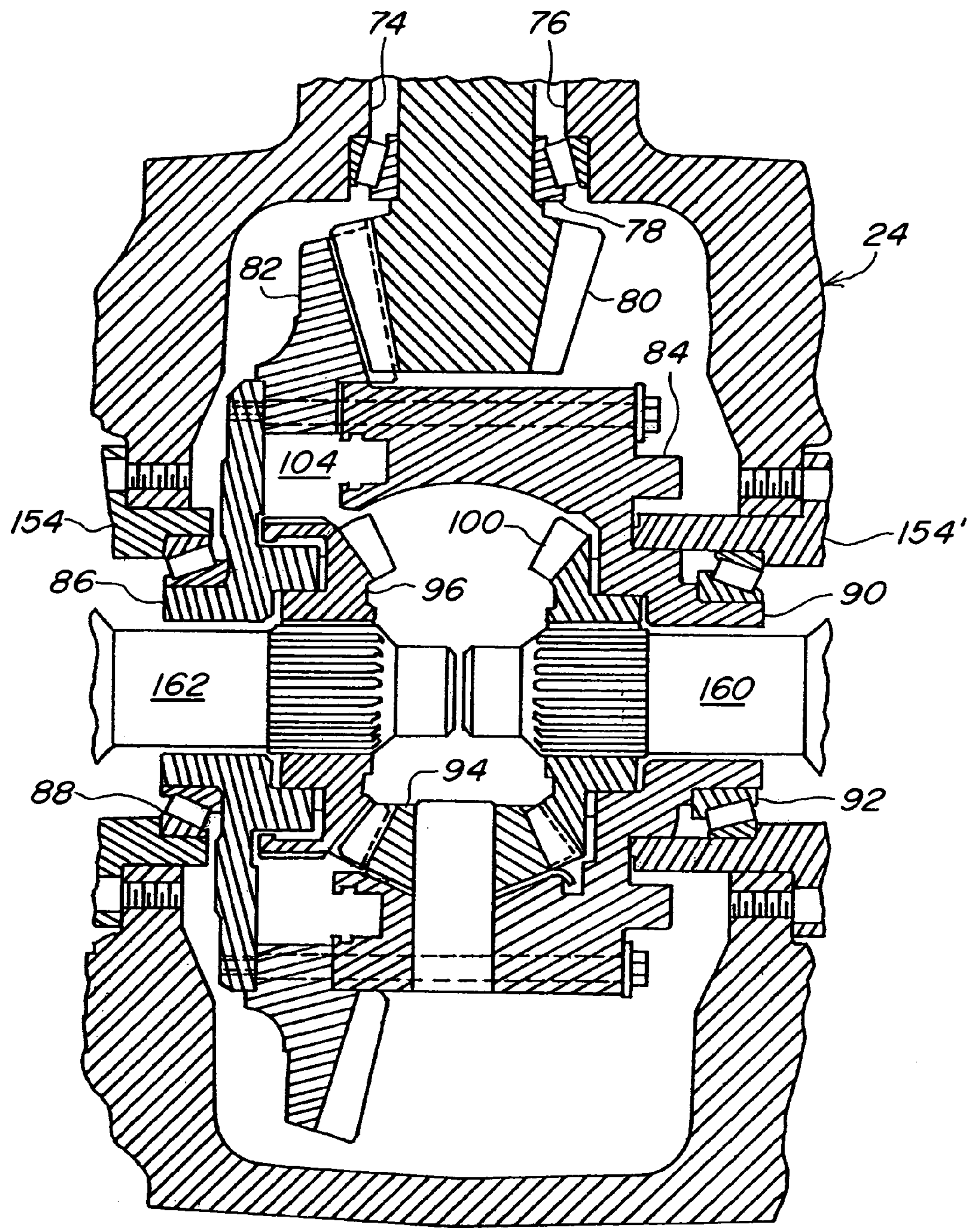
FIG. 8 is a view like FIG. 3, but showing the ring gear and associated components of the differential of the standard tractor repositioned for driving the self-propelled vehicle in its normal forward direction of operation.

Because the self-propelled vehicle 140 has a direction of operation that is opposite to that of the standard tractor 10, it is desired that the output of the main transmission be reversed without changing the operation of the main transmission so that load transmitting capabilities of the gearing for forward operation is retained. This is accomplished according to the invention by reversing power flow through the rear differential. With reference to FIG. 8, it can be seen that the differential housing 84, together with the bearings 88 and 92, has, in effect, been rotated through 180°, relative to its position shown in FIG. 3 so that the bearings 88 and 92 now respectively support the housing 84 for rotation within inner ends of the axle extensions 154' and 154. The ring gear 82 is now meshed with the left-hand side of the pinion 80 so that the differential housing 84 is rotated in a direction opposite to that in which it rotates in the arrangement of FIG. 3. A further change which is required when using the axle extensions 154 and 154' is that the output shafts 98 and 102 are respectively replaced by longer output shafts 160 and 162.

Figure 9:
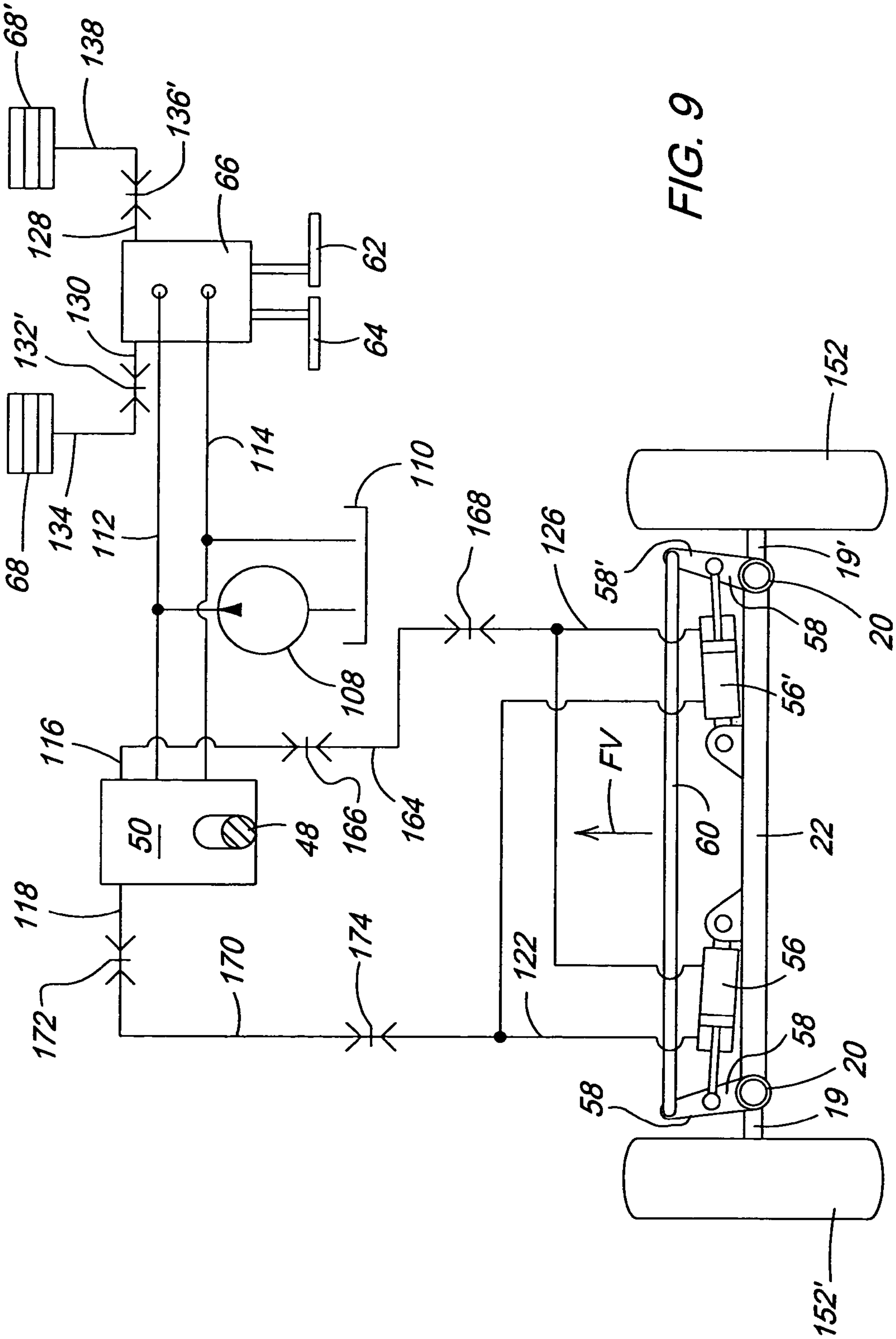
FIG. 9 is a schematic view like that of FIG. 4 but showing the hydraulic fluid circuitry used for the conveyance of fluid for steering and brake control with the self-propelled implement shown in FIG. 3.

Because the cab 34 of the self-propelled vehicle 140 faces in a direction opposite to that in which it faces when used with the standard tractor 10, a change is required in the circuitry illustrated in FIG. 4 in order that the appropriate wheels will be steered and braked when the operator turns the steering wheel 46 and depresses the brake pedals 62 and 64. With reference to FIG. 9, it can be seen that the conduit 116 is now connected to the branched conduit 126 by a length of conduit 164 forming respective quick coupler connections 166 and 168 with the conduits 116 and 126. Similarly, the conduit 118 is now connected to the branched conduit 122 by a length of conduit 170 forming respective quick coupler connections 172 and 174 with the conduit 118 and branched conduit 122. It will be appreciated then that turning the steering wheel 46 to the right (clockwise as viewed in FIG. 9) will result in the right- and left-hand rear wheels 152 and 152' turning to the left so that the rear part of the vehicle 140 tracks to the left and in this way causes the vehicle 140 to turn to the right. A left turn is similarly caused by turning the steering wheel to the left or counterclockwise. The additional lengths of conduit 164 and 170 are required to make up for the increased distance between the steering valve 50 and the connection points of the branched conduits 122 and 126 when the cab 34 is positioned for operation with the vehicle 140 as compared to when it is positioned for operation with the tractor 10.

So that the right- and left-hand wheel 18' and 18, respectively, of the vehicle 140 are respectively braked when the right- and left-hand brake pedals 62 and 64 are depressed, the conduit 128 is coupled to the brake 68' and the conduit 130 is coupled to the brake 68. Because the distance of the brakes 68 and 68' from the brake valve 66 is substantially the same for both the tractor 10 and the vehicle 140, no additional length of conduit is required for coupling the brake valve 66 so as to correctly operate the brakes 68' and 68 of the vehicle 140.

It will be appreciated then that the present invention will have its highest utility if it is implemented during the manufacturing process. For example, if it is desired to change a manufacturing assembly line from one that is making standard tractors 10 to one for assembling self-propelled vehicles 140, this may be done by merely by:

1. changing the configuration of the preassembled rear differential so that it is in the configuration disclosed in FIG. 9 (aside from the axle extensions 154 and 154' and longer output shafts;
2. providing front axles 22 that are adjusted to the length desired for the vehicles 140;
3. providing any additional rear axle housing and shafting components as may be required to construct a rear axle having the desired length;
4. providing wheels of the desired size and tread orientation;
5. providing cab adapter modules 142;
6. providing cabs 34 which are preassembled without fenders or ladders attached; and
7. providing any additional conduits required for connecting the steering valve for proper steering operation of the wheels 152 and 152'.

Except for additional steps required in assembling the rear axle extensions 154 and 154', for mounting the cab to the cab adapter 142 (the step for mounting the adapter takes the place of the step for mounting the cab 34 to the chassis), the assembly steps followed in constructing the self-propelled vehicle 140 are the same as those used in assembling the standard tractor 10. Importantly, the cab adapter 142 and conduit extensions 164 and 170 are the only extra components used in constructing the vehicle 140, with the different wheels, axle extensions and axle shafts also being available for use with standard tractors.

Having described the preferred embodiment, it will become apparent that various modifications can be made without departing from the scope of the invention as defined in the accompanying claims.

What is claimed is:

1. In combination with an assembly of parts forming a major portion of a standard, high crop agricultural tractor and including a chassis defined by a main longitudinally extending frame supported on a pair of steerable front wheels, as considered in a normal forward direction of travel, mounted to opposite ends of a front axle coupled to a front end of said frame, and on a pair of drivable rear wheels mounted to opposite ends of a rear axle including an axle housing coupled to a rear end of said frame, said rear axle being defined in part by a differential assembly including a housing containing differential gearing coupled for transmitting torque to said rear drive wheels delivered from an engine located in a forward region of said chassis and coupled for driving a main transmission extending between the engine and said differential assembly, a cab mounting structure fixed to said chassis and to said rear axle housing, structure for use in combination with said assembly of parts for constructing a self-propelled agricultural vehicle, which normally operates in a direction opposite to said normal forward direction, comprising: a cab adapter module mounted to said cab mounting structure so as to occupy a region behind said engine and over said transmission and differential assembly; and a cab, which would face in said normal forward direction of travel if mounted directly to said cab mounting structure, being mounted to said cab adapter module and facing in a direction opposite said normal forward direction of travel.

2. In combination with an assembly of parts forming a major portion of a standard, high crop agricultural tractor and including a chassis defined by a main longitudinally extending frame supported on a pair of steerable front wheels, as considered in a normal forward direction of travel, mounted to opposite ends of a front axle coupled to a front end of said frame, and on a pair of drivable rear wheels mounted to opposite ends of a rear axle including an axle housing coupled to a rear end of said frame, said rear axle being defined in part by a differential assembly including a housing containing differential gearing coupled for transmitting torque to said rear drive wheels delivered from an engine located in a forward region of said chassis and coupled for driving a main transmission extending between the engine and said differential assembly, structure for use in combination with said assembly of parts for constructing a self-propelled agricultural vehicle, which normally operates in a direction opposite to said normal forward direction, comprising: a cab adapter module mounted to said chassis in a region behind said engine and over said transmission and differential assembly; and a cab being mounted to said cab adapter module and facing in a direction opposite said normal forward direction of travel; and said transmission a gear transmission and said differential assembly designed for permitting said differential gearing to be assembled in such a way as to effect a reversal in a direction that torque is delivered to said rear drive wheels, whereby when said cab is mounted to said cab adapter the resulting vehicle may be driven using the direction that the cab then faces as a forward direction of travel.

3. In combination with an assembly of parts forming a major portion of a standard, high crop agricultural tractor and including a chassis defined by a main longitudinally extending frame supported on a pair of steerable front wheels, as considered in a normal forward direction of travel, mounted to opposite ends of a front axle coupled to a front end of said frame, and on a pair of drivable rear wheels mounted to opposite ends of a rear axle including an axle housing coupled to a rear end of said frame, said rear axle being defined in part by a differential assembly including a housing containing differential gearing coupled for transmitting torque to said rear drive wheels delivered from an engine located in a forward region of said chassis and coupled for driving a main transmission extending between the engine and said differential assembly, and a three-point hitch mounted to said chassis in a region between said rear wheels, structure for use in combination with said assembly of parts for constructing a self-propelled agricultural vehicle, which normally operates in a direction opposite to said normal forward direction, comprising: a cab adapter module mounted to said chassis in a region behind said engine and over said transmission and differential assembly, with said cab adapter extending vertically above at least a portion of said three-point hitch; and a cab being mounted to said cab adapter module and facing in a direction opposite said normal forward direction of travel.

4. The combination, as defined in claim 3, wherein a mower conditioner is mounted to said three-point hitch and includes a windrow-forming structure extending between said rear wheels and beneath said rear axle, whereby said mower-conditioner will be easily observable by an operator located in said cab.

5. A method for constructing a self-propelled vehicle from substantially all components of a standard agricultural tractor equipped with a cab, comprising the steps of:

a. assembling said tractor to the point where the next step is to connect said cab to a chassis;

b. assembling a cab adapter to said chassis;

c. connecting said cab to said cab adapter in a direction facing opposite to that which said cab would face if assembled to said chassis for forming said standard tractor.

6. The method for constructing a self-propelled vehicle, as defined in claim 5, wherein said standard agricultural tractor includes a main gear transmission and a rear differential which may be configured so as to drive in direction opposite to that in which it drives for forward operation of said tractor, and said step of assembling said tractor includes an initial step of assembling the rear differential for driving in said direction opposite to that in which it drives for forward operation of said tractor.

* * * * *